(12) United States Patent
Wang et al.

(10) Patent No.: US 10,274,615 B2
(45) Date of Patent: Apr. 30, 2019

(54) DETECTION PANEL AND DETECTION APPARATUS

(71) Applicant: BOE TECHNOLOGY GROUP CO., LTD., Beijing (CN)

(72) Inventors: Xiyuan Wang, Beijing (CN); Hui Tian, Beijing (CN); Yanzhao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 5 days.

(21) Appl. No.: 15/561,760

(22) PCT Filed: Apr. 7, 2017

(86) PCT No.: PCT/CN2017/079714
§ 371 (c)(1),
(2) Date: Sep. 26, 2017

(87) PCT Pub. No.: WO2018/023995
PCT Pub. Date: Feb. 8, 2018

(65) Prior Publication Data
US 2018/0246227 A1    Aug. 30, 2018

(30) Foreign Application Priority Data
Aug. 5, 2016    (CN) .......................... 2016 1 0639194

(51) Int. Cl.
*G01T 1/20* (2006.01)
*G01T 1/202* (2006.01)
*G01T 1/208* (2006.01)

(52) U.S. Cl.
CPC ............ *G01T 1/2018* (2013.01); *G01T 1/202* (2013.01); *G01T 1/208* (2013.01); *G01T 1/2023* (2013.01)

(58) Field of Classification Search
CPC ...... G01T 1/2018; G01T 1/208; G01T 1/2023
USPC .......................................... 250/369
See application file for complete search history.

(56) References Cited

U.S. PATENT DOCUMENTS

2010/0314531 A1    12/2010   Menge
2013/0082184 A1    4/2013    Nakatsugawa et al.
2014/0361182 A1    12/2014   Hasegawa et al.

FOREIGN PATENT DOCUMENTS

| CN | 102445703 A | 5/2012 |
| CN | 102918419 A | 2/2013 |
| CN | 104240786 A | 12/2014 |
| CN | 206096478 U | 4/2017 |

OTHER PUBLICATIONS

Search Report and Written Opinion dated Jun. 29, 2017 from State Intellectual Property Office of the P.R. China.

*Primary Examiner* — David P Porta
*Assistant Examiner* — Gisselle M Gutierrez
(74) *Attorney, Agent, or Firm* — Dilworth & Barrese, LLP.; Michael J. Musella, Esq.

(57) ABSTRACT

A detection panel and a detection apparatus are provided. The detection panel includes: a cesium iodide scintillator layer, which is not doped with thallium; and a photoelectric detector, which is arranged on a light emission side of the cesium iodide scintillator layer and includes a semiconductor layer; a forbidden band width of a material for forming the semiconductor layer is greater than or equal to 2.3 eV.

20 Claims, 2 Drawing Sheets

DETECTION PANEL AND DETECTION APPARATUS

TECHNICAL FIELD

Embodiments of the present disclosure relate to a detection panel and a detection apparatus.

BACKGROUND

X-ray, due to the characteristics of high photon energy and high penetration, has been widely applied in life of people, and for example, the X-ray is used for fluoroscopic examination in the field of medicine, used for fault detection in industry, and used for security check in places such as a subway, an airport, a station and the like.

Currently, an X-ray detection apparatus in sale in market generally includes a scintillator layer, a detector arranged on a light emission side of the scintillator layer and a circuit. The scintillator layer is used for converting the X-ray into a light, the detector is used for converting the light output by the scintillator layer into an electric signal, and then the circuit outputs the electric signal to a display after processing the electric signal so as to form an image of a detected object.

SUMMARY

According to embodiments of the disclosure, a detection panel is provided. The detection panel comprises: a cesium iodide scintillator layer, which is not doped with thallium; and a photoelectric detector, which is arranged on a light emission side of the cesium iodide scintillator layer and includes a semiconductor layer, wherein a forbidden band width of a material for forming the semiconductor layer is greater than or equal to 2.3 eV.

For example, a material for forming the cesium iodide scintillator layer is a pure cesium iodide scintillator or a cesium iodide scintillator doped with natrium.

For example, the material for forming the semiconductor includes a zinc oxide semiconductor.

For example, a material for forming the cesium iodide scintillator layer is a pure cesium iodide scintillator.

For example, the zinc oxide semiconductor is an n-type doped zinc oxide semiconductor, and is doped with one or more of B, Al, Ga, In, Sc, Y, Si, Ge, Sn, Ti, Zr, V, Nb, Mo, F and Cl.

For example, the zinc oxide semiconductor is a p-type doped zinc oxide semiconductor, and is doped with one or more of Li, Na, K, Au, Ag, Cu, N, P, As and Sb.

For example, the material for forming the semiconductor layer includes a zinc oxynitride semiconductor, or a gallium nitride semiconductor, or a silicon carbide semiconductor, or a diamond semiconductor, or a diamond-like semiconductor, or an aluminium nitride semiconductor, or a gallium arsenide semiconductor, or a boron nitride semiconductor, or a combination thereof.

For example, the photoelectric detector is a photoconductive detector or a photovoltaic detector.

For example, a thickness of the cesium iodide scintillator layer is 1 micrometer to 2,000 micrometers.

For example, the cesium iodide scintillator layer includes a plurality of cesium iodide columnar crystals arranged in array.

For example, a diameter of each cesium iodide columnar crystal is 0.1 micrometer to 100 micrometers.

For example, the detection panel further comprises a thin film transistor switch array arranged on a side of the photoelectric detector which is away from the cesium iodide scintillator layer.

For example, the detection panel is an X-ray detection panel.

According to the embodiments of the disclosure, a detection apparatus is provided. The detection apparatus comprises the detection panel as described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms here should be of general meaning as understood by those ordinarily skilled in the art. In the descriptions and claims of the present disclosure, expressions such as "first", "second" and the like do not denote any order, quantity, or importance, but rather are used for distinguishing different components. Expressions such as "include" or "comprise" and the like denote that elements or objects appearing before the words of "include" or "comprise" cover the elements or the objects enumerated after the words of "include" or "comprise" or equivalents thereof, not exclusive of other elements or objects. Expressions such as "connect" or "interconnect" and the like are not limited to physical or mechanical connections, but may include electrical connections, whether direct or indirect. Expressions such as "up", "down", "left", "right" and the like are only used for expressing relative positional relationship, the relative positional relationship may be correspondingly changed in the case that the absolute position of a described object is changed.

Figure 1:
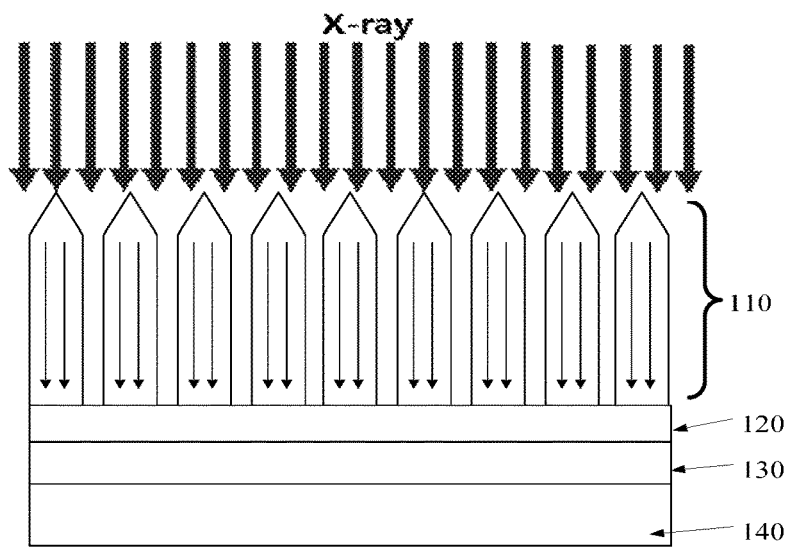
FIG. 1 is a structural schematic view illustrating an X-ray detection panel.

FIG. 1 is a structural schematic view illustrating an X-ray detection panel according to one technique. As shown in FIG. 1, the detection panel includes a base substrate 140, and a switching circuit 130, a photoelectric detector 120 and a scintillator layer 110 which are positioned on the base substrate 140. The scintillator layer 110 is made of a CsI:Tll (cesium iodide doped with thallium iodide, CsI (Tl)) scintillator material so as to convert high-energy X-rays into a visible light (shown as arrows in the drawing). The photoelectric detector 120 for example is an amorphous silicon photoelectric detector, and is used for detecting the visible light output by the scintillator layer 110. A peak wavelength (i.e., a wavelength corresponding to a maximum response rate) of the amorphous silicon photoelectric detector 120 is about 550 nanometers (nm) and the amorphous silicon photoelectric detector 120 has a relatively low photoelectric response capacity for an ultraviolet light with a wavelength smaller than 440 nm, and thus, in order to enable the light output by the scintillator layer 110 to be effectively detected by the photoelectric detector 120, a doping amount of thallium (Tl) in the scintillator layer 110 needs to be adjusted so as to adjust the wavelength of the light output by the scintillator layer 110 to a range near the peak wavelength of the amorphous silicon photoelectric detector 120.

In research, inventors of the application notes that the X-ray detection panel which adopts the CsI:Tll scintillator material to make the scintillator layer is relatively high in fabricating cost, which is because that: thallium and a compound thereof such as thallium iodide are extremely toxic substances and cause serious damage to human bodies after entering the human bodies, and thus, the X-ray detection panel which adopts the CsI:Tll scintillator material to make the scintillator layer needs to adopt a high-level safety protection measure during the production process, and the detection panel cannot be randomly abandoned after being scrapped and needs to be subjected to special recycling processing so as to avoid damage to the environment; and furthermore, thallium metal is a heavy metal, so that fabricating cost of the X-ray detection panel is further increased.

Figure 2:
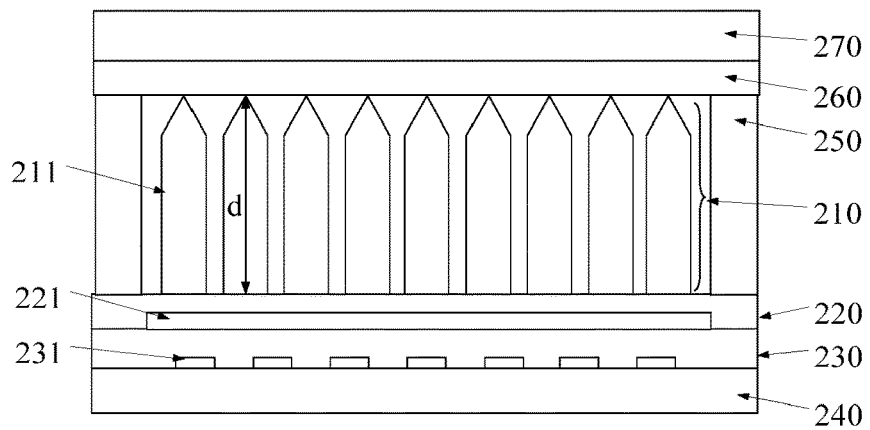
FIG. 2 is a structural schematic view illustrating a detection panel provide by embodiments of the present disclosure.

As shown in FIG. 2, at least one embodiment of the present disclosure provides a detection panel; the detection panel includes a base substrate 240, and a cesium iodide (CsI) scintillator layer 210 and a photoelectric detector 220 which are arranged on the base substrate 240. The cesium iodide scintillator layer 210 itself and a material for forming the cesium iodide scintillator layer 210 are not doped with thallium; and the photoelectric detector 220 is arranged on a light emission side of the cesium iodide scintillator layer 210 and includes a semiconductor layer 221, and a forbidden band width of a material for forming the semiconductor layer 221 is greater than or equal to 2.3 eV (electron volt). For example, the semiconductor layer 221 is only consisted of the material with the forbidden band width greater than or equal to 2.3 eV.

According to the embodiments of the present disclosure, by combining the cesium iodide scintillator layer non-doped with thallium and the photoelectric detector which adopts a semiconductor with a wide forbidden band width together, the extremely toxic thallium and compound thereof such as thallium iodide are avoided, so that fabricating cost of the detection panel is greatly reduced and the detection panel is friendly and non-toxic to the environment and people.

The cesium iodide scintillator layer non-doped with thallium converts the X-rays into a near ultraviolet light. The amorphous silicon photoelectric detector is relatively low in photoelectric response capacity for the near ultraviolet light and is very poor in detection sensitivity for the near ultraviolet light, and an amorphous silicon material has a photo-induced degradation effect after being irradiated by the ultraviolet light, which causes drift of a response curve of the amorphous silicon photoelectric detector and causes reduction of quality of an output image and even generate a false image. In the embodiments of the disclosure, the detection panel adopts the semiconductor material of which the forbidden band width is greater than or equal to 2.3 eV to manufacture the photoelectric detector 220, so that an optical cut-off wavelength (i.e., a wavelength corresponding to a case that a response rate is reduced to half of the maximum response rate, which represents an applicable wavelength range of the photoelectric detector) of the photoelectric detector 220 is smaller than or equal to 540 nm, and the near ultraviolet light output by the cesium iodide scintillator layer are effectively detected.

For example, the base substrate 240 is a glass substrate with a thickness of 0.1 mm to 1 mm. For example, the base substrate 240 is a polyethylene terephthalate (PET) or polyimide (PI) transparent flexible substrate, and for example, a thickness of the transparent flexible substrate is 1 micrometer to 500 micrometers. The embodiments of the present disclosure include, but are not limited to, the illustrated substrate.

For example, the detection panel provided by at least one embodiment of the present disclosure is the X-ray detection panel.

For example, the material for forming the cesium iodide scintillator layer 210 is a pure cesium iodide scintillator (CsI (pure)), i.e., a non-doped cesium iodide scintillator. For example, the material for forming the cesium iodide scintillator layer 210 is a cesium iodide scintillator doped with natrium (CsI (Na)).

Figure 3:
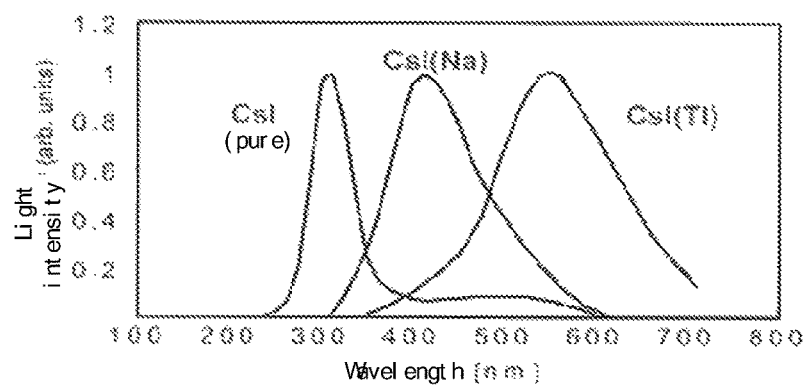
FIG. 3 is an X-ray photoluminescence spectrum of CsI (pure), CsI (Na) and CsI (Tl)

The cesium iodide scintillator layer non-doped with thallium effectively adsorbs the X-rays and convert the X-rays into the near ultraviolet light. For example, as shown in FIG. 3, the pure cesium iodide scintillator adsorbs the X-rays and converts the X-rays into the near ultraviolet light with a peak wavelength of about 310 nm, and the cesium iodide scintillator doped with natrium (e.g., a cesium iodide scintillator doped with NaI) converts the X-rays into the near ultraviolet light with a peak wavelength of about 420 nm.

For example, as shown in FIG. 2, a thickness d of the cesium iodide scintillator layer 210 is 1 micrometer to 2,000 micrometers. If the cesium iodide scintillator layer is excessively thin, efficiency of converting the X-rays into the near ultraviolet light is relatively low; and if the cesium iodide scintillator layer is excessively thick, cost of the scintillator layer is high and light conversion efficiency is low because the X-rays are apt to be adsorbed by the scintillator layer. Further, for example, the thickness d of the cesium iodide scintillator layer 210 is 500 to 600 micrometers.

For example, the cesium iodide scintillator layer 210 includes a plurality of cesium iodide columnar crystals 211 arranged in array. For example, a diameter of each cesium iodide columnar crystal 211 is 0.1 micrometer to 100 micrometers. If the cesium iodide columnar crystal 211 is excessively thick, crosstalk is easy to increase; and if the cesium iodide columnar crystal 211 is excessively thin, light conversion efficiency of the columnar crystal is relatively low and a space between the columnar crystals is large so that pixel points of an image generated by the detection panel are sparse. Further, for example, the diameter of each cesium iodide columnar crystal 211 is 1 micrometer to 20 micrometers The cesium iodide scintillator material is easy to deliquesce, and thus, the cesium iodide scintillator layer 210 needs to be packaged to obstruct water and oxygen in the air.

For example, as shown in FIG. 2, the detection panel provided by at least one embodiment of the present disclosure further includes a connection portion 250, a sealing layer 260 arranged on a light incident side of the cesium iodide scintillator layer 210, and a transparent organic protective film 270 covering the sealing layer. The connection portion 250 (e.g., a dam glue) connects the sealing layer 260 and the photoelectric detector 220 to form a hermetic cavity for accommodate the cesium iodide scintillator layer 210.

For example, the sealing layer 260 comprises a single package thin film, or the sealing layer 260 comprises multiple stacked package thin films. For example, the sealing layer 260 is an organic layer or an inorganic layer or a lamination of the organic layer and the inorganic layer.

It should be noted that, a packaging manner of the cesium iodide scintillator layer 210 includes, but is not limited to, the embodiment as shown in FIG. 2. For example, a filler adhesive is further filled in the hermetic cavity. For example, a laminator is adopted to replace the connection portion 250 and the sealing layer 260 to carry out packaging. For example, a substrate is arranged on the light incident side of the cesium iodide scintillator layer 210, and the substrate is connected with the base substrate 240 in a mode of sintering frit by laser so as to form the hermetic cavity.

For example, the detection panel provided by at least one embodiment of the present disclosure further includes a thin film transistor switch array 230 arranged on a side of the photoelectric detector 220 which is away from the cesium iodide scintillator layer 210, and the thin film transistor switch array 230 includes a plurality of thin film transistors 231 and is used for controlling reading of an output signal of the photoelectric detector 220.

It should be noted that the embodiments of the present disclosure do not limit a relationship among the number of the thin film transistors 231, the number of the photoelectric detector 220 and the number of the cesium iodide columnar crystals 211, and the numbers of those parts may be set according to actual demands.

For example, the thin film transistor 231 is an amorphous silicon thin film transistor, an amorphous indium gallium zinc oxide thin film transistor, a low-temperature polycrystalline indium gallium zinc oxide thin film transistor, a low-temperature polycrystalline silicon thin film transistor, a zinc oxynitride thin film transistor or an organic thin film transistor.

For example, the material for forming the semiconductor layer 221 of the photoelectric detector 220 includes a zinc oxide (ZnO) semiconductor.

The zinc oxide semiconductor has a wide forbidden band and direct bandgap, electrons and holes in the zinc oxide semiconductor are directly recombined so that the photoelectric detector prepared by replacing the amorphous silicon material with the zinc oxide semiconductor has relatively high efficiency. Moreover, the zinc oxide semiconductor is nontoxic for people and the environment, is rich in reserve volume on the earth and low in price.

For example, in a case that the photoelectric detector 220 adopts the zinc oxide semiconductor, the cesium iodide scintillator layer 210 is formed by the pure cesium iodide scintillator. The pure cesium iodide scintillator converts the X-rays into the near ultraviolet light of which the peak wavelength is about 310 nm, the forbidden band width of the zinc oxide semiconductor is 3.37 eV, the optical cut-off wavelength is 1240/3.37=370 nm, and a photoelectric response quantum efficiency of the zinc oxide semiconductor to the near ultraviolet light with the wavelength of 300 to 370 nm is higher than 10%, and thus, by adopting a combination of the pure cesium iodide scintillator and the zinc oxide semiconductor, the photoelectric detector 220 effectively detects the near ultraviolet light output by the cesium iodide scintillator layer 210.

In addition, the optical cut-off wavelength of the zinc oxide semiconductor is 370 nm, and then the photoelectric detector 220 has no photoelectric response to the visible light, and thus, an optical filter for blocking the visible light to enter is not needed to be provided on the light incident side of the photoelectric detector 220, so that not only the cost is reduced, but also the crosstalk possibly caused by the visible light in the environment is prevented.

For example, the zinc oxide semiconductor is an n-type doped zinc oxide semiconductor, and is doped with one or more of B, Al, Ga, In, Sc, Y, Si, Ge, Sn, Ti, Zr, V, Nb, Mo, F and Cl.

For example, the zinc oxide semiconductor is a p-type doped zinc oxide semiconductor, and is doped with one or more of Li, Na, K, Au, Ag, Cu, N, P, As and Sb.

For example, in the embodiments of the present disclosure, the material for forming the semiconductor layer 221 includes a zinc oxynitride semiconductor, or a gallium nitride semiconductor, or a silicon carbide semiconductor, or a diamond semiconductor, or a diamond-like semiconductor, or an aluminium nitride semiconductor, or a gallium arsenide semiconductor, or a boron nitride semiconductor, or a combination thereof. Those semiconductor materials effectively detect the near ultraviolet light, and have no response to the visible light in the environment, so that crosstalk of environmental light is greatly reduced, the optical filter for blocking the visible light is omitted and a signal-to-noise ratio is improved.

For example, in at least one embodiment of the present disclosure, the photoelectric detector 220 is a photoconductive detector or a photovoltaic detector.

The photoconductive detector is a detector produced by utilizing a photoconductive effect of the semiconductor material. The photoconductive effect is a physical phenomenon that an electrical conductivity of a material is changed due to being radiated. The photoconductive detector for example includes a different-plane type photoconductive detector and a co-plane type photoconductive detector.

The photovoltaic detector is a detector produced by utilizing a photovoltaic effect of a PN junction of the semiconductor, and is also called as a junction-type photoelectric detector. The photovoltaic detector includes various types, and an avalanche photoelectric detector is one of the various types. The avalanche photoelectric detector adopts an avalanche photoelectric diode (APD), and has a high response capacity.

The photoelectric detector in the embodiments of the present disclosure will be described in details in connection of FIG. 4a to FIG. 4d.

Figure 4A:
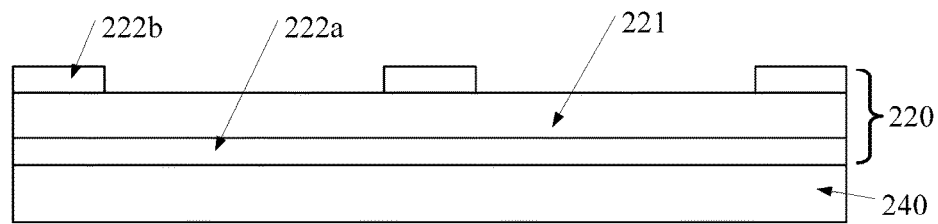
FIG. 4a is a structural schematic view illustrating a different-plane type photoconductive detector provided by the embodiments of the present disclosure.

For example, as shown in FIG. 4a, the photoelectric detector 220 is the different-plane type photoconductive detector, and includes a first electrode 222a, the semiconductor layer 221 positioned on the first electrode 222a, and a plurality of second electrodes 222b positioned on the semiconductor layer 221. In other words, the second electrodes 222b and the first electrode 222a are respectively arranged on a light incident side and a side opposite to the light incident side of the semiconductor layer 221.

Figure 4B:
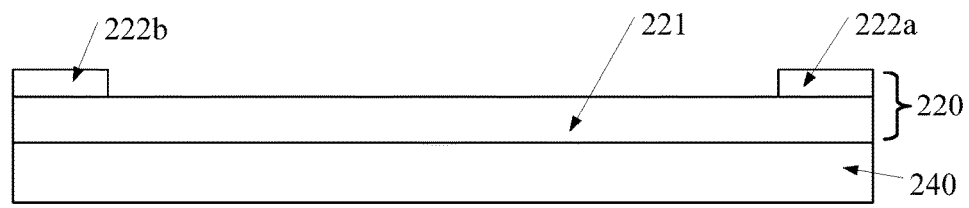
FIG. 4b is a structural schematic view illustrating a co-plane type photoconductive detector provided by the embodiments of the present disclosure.

For example, as shown in FIG. 4b, the photoelectric detector 220 is the co-plane type photoconductive detector, and includes the semiconductor layer 221 and the first electrode 222a and the second electrode 222b which are arranged on the light incident side of the semiconductor layer 221.

Figure 4C:
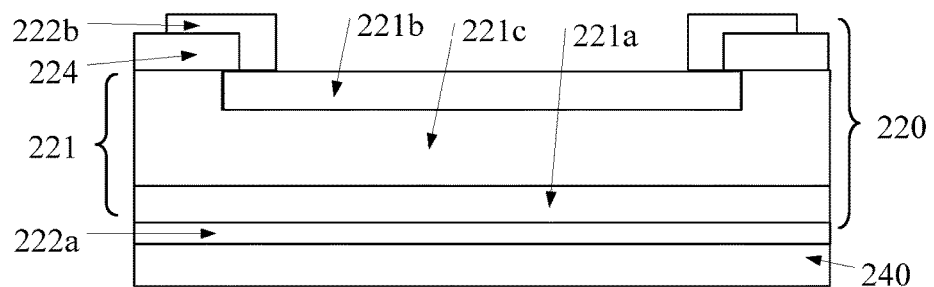
FIG. 4c is a structural schematic view illustrating a p-i-n type photovoltaic detector provided by the embodiments of the present disclosure.

For example, as shown in FIG. 4c, the photoelectric detector 220 is a p-i-n type photovoltaic detector, and includes the semiconductor layer 221, an insulation layer 224, and the first electrode 222a and the plurality of second electrodes 222b which are respectively positioned on the side opposite to the light incident side and the light incident side of the semiconductor layer 221. The semiconductor layer 221 includes an intrinsic semiconductor 221c, and a first doped semiconductor 221a and a second doped semiconductor 221b which are respectively arranged on both sides of the intrinsic semiconductor 221c. One of the first doped semiconductor 221a and the second doped semiconductor 221b is a p-type doped semiconductor and the other one is an n-type doped semiconductor. The insulation layer 224 separates the second electrodes 222b from the intrinsic semiconductor 221c.

Figure 4D:
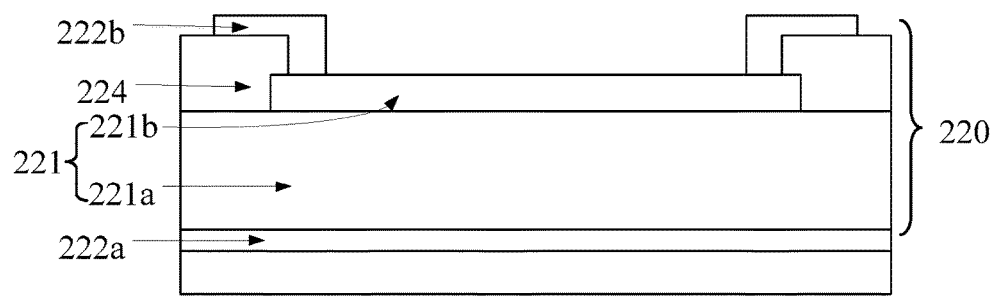
FIG. 4d is a structural schematic view illustrating a p-n type photovoltaic detector provided by the embodiments of the present disclosure.

For example, as shown in FIG. 4d, the photoelectric detector 220 is a p-n type photovoltaic detector, and includes the semiconductor layer 221, the insulation layer 224, and the first electrode 222a and the plurality of second electrodes 222b which are respectively positioned on the side opposite to the light incident side and the light incident side of the semiconductor layer 221. The semiconductor layer 221 includes the first doped semiconductor 221a and the second doped semiconductor 221b, one of the first doped semiconductor 221a and the second doped semiconductor 221b is the p-type doped semiconductor and the other one is the n-type doped semiconductor. The insulation layer 224 separates the second electrodes 222b from the first doped semiconductor 221a.

In any one photoelectric detector described above, one of the first electrode and the second electrode is an anode, and the other one is a cathode. For example, both the first electrode and the second electrode are made of a metal material, e.g., one or more of metals such as aluminium, aluminium neodymium alloy, copper, titanium, molybdenum, molybdenum niobium alloy and the like.

At least one embodiment of the present disclosure further provides a detection apparatus, which includes the detection panel provided by any one embodiment described above.

For example, the detection apparatus further includes a peripheral circuit, e.g., devices such as a display and the like. After the X-rays enter the detection panel of the detection apparatus, the X-rays are converted into the near ultraviolet light by the cesium iodide scintillator layer, then the near ultraviolet light is converted into an electric signal by the photoelectric detector, the electric signal is collected and output by the thin film transistor switch array, and finally, an image is formed on the display.

From the above, according to the detection panel and the detection apparatus which are provided by the embodiments of the present disclosure, by combining the cesium iodide scintillator layer non-doped with thallium (Tl) with the photoelectric detector which adopts the wide forbidden band semiconductor together, the extremely toxic thallium and compound thereof such as thallium iodide are avoided, so that fabricating cost of the detection panel is greatly reduced, the detection panel and the detection apparatus are friendly and non-toxic to the environment and people, and the near ultraviolet light output by the cesium iodide scintillator layer is effectively detected.

In a case of no conflict, the embodiments of the present disclosure and characteristics in the embodiments can be combined mutually.

The foregoing embodiments merely are exemplary embodiments of the disclosure, and not intended to define the scope of the disclosure, and the scope of the disclosure is determined by the appended claims.

The present application claims priority of the Chinese Patent Application No. 201610639194.9 filed on Aug. 5, 2016, the disclosure of which are incorporated herein by its reference in its entirety as part of the present application.

The invention claimed is:

1. A detection panel, comprising:
   a cesium iodide scintillator layer, which is not doped with thallium; and
   a photoelectric detector, which is arranged on a light emission side of the cesium iodide scintillator layer and includes a semiconductor layer, wherein a forbidden band width of a material for forming the semiconductor layer is greater than or equal to 2.3 eV;
   wherein the semiconductor layer includes zinc oxide semiconductor, the zinc oxide semiconductor including an n-type doped zinc oxide semiconductor doped with one or more of B, Al, Sc, Y, Ge, Sn, Ti, Zr, V, Nb, Mo, F and Cl.

2. The detection panel according to claim 1, wherein a material for forming the cesium iodide scintillator layer is a pure cesium iodide scintillator or a cesium iodide scintillator doped with natrium.

3. The detection panel according to claim 1, wherein a material for forming the cesium iodide scintillator layer is a pure cesium iodide scintillator.

4. The detection panel according to claim 1, wherein the material for forming the semiconductor layer includes a zinc oxynitride semiconductor, or a gallium nitride semiconductor, or a silicon carbide semiconductor, or a diamond semiconductor, or a diamond-like semiconductor, or an aluminium nitride semiconductor, or a gallium arsenide semiconductor, or a boron nitride semiconductor, or a combination thereof.

5. The detection panel according to claim 1, wherein the photoelectric detector is a photoconductive detector or a photovoltaic detector.

6. The detection panel according to claim 1, wherein a thickness of the cesium iodide scintillator layer is 1 micrometer to 2,000 micrometers.

7. The detection panel according to claim 1, wherein the cesium iodide scintillator layer includes a plurality of cesium iodide columnar crystals arranged in array.

8. The detection panel according to claim 7, wherein a diameter of each cesium iodide columnar crystal is 0.1 micrometer to 100 micrometers.

9. The detection panel according to claim 1, further comprising a thin film transistor switch array arranged on a side of the photoelectric detector which is away from the cesium iodide scintillator layer.

10. The detection panel according to claim 1, wherein the detection panel is an X-ray detection panel.

11. The detection panel according to claim 9, further comprising a display electrically connected to the thin film transistor switch array.

12. A detection panel, comprising:
   a cesium iodide scintillator layer, which is not doped with thallium; and a photoelectric detector, which is arranged on a light emission side of the cesium iodide scintillator layer and includes a semiconductor layer, wherein a forbidden band width of a material for forming the semiconductor layer is greater than or equal to 2.3 eV;

and wherein the semiconductor layer includes zinc oxide semiconductor, the zinc oxide semiconductor including a p-type doped zinc oxide semiconductor doped with one or more of Li, Na, K, Au, Ag, Cu, N, P, As and Sb.

13. The detection panel according to claim 12, wherein a material for forming the cesium iodide scintillator layer is a pure cesium iodide scintillator or a cesium iodide scintillator doped with natrium.

14. The detection panel according to claim 12, wherein the material for forming the semiconductor layer includes a zinc oxynitride semiconductor, or a gallium nitride semiconductor, or a silicon carbide semiconductor, or a diamond semiconductor, or a diamond-like semiconductor, or an aluminium nitride semiconductor, or a gallium arsenide semiconductor, or a boron nitride semiconductor, or a combination thereof.

15. The detection panel according to claim 12, wherein the photoelectric detector is a photoconductive detector or a photovoltaic detector.

16. The detection panel according to claim 12, wherein a thickness of the cesium iodide scintillator layer is 1 micrometer to 2,000 micrometers.

17. The detection panel according to claim 16, wherein the cesium iodide scintillator layer includes a plurality of cesium iodide columnar crystals arranged in array, and a diameter of each cesium iodide columnar crystal is 0.1 micrometer to 100 micrometers.

18. The detection panel according claim 12, further comprising a thin film transistor switch array arranged on a side of the photoelectric detector which is away from the cesium iodide scintillator layer.

19. A detection apparatus, comprising a detection panel, wherein the detection panel comprising:
a cesium iodide scintillator layer, which is not doped with thallium; and
a photoelectric detector, which is arranged on a light emission side of the cesium iodide scintillator layer and includes a semiconductor layer, wherein a forbidden band width of a material for forming the semiconductor layer is greater than or equal to 2.3 eV;
wherein the semiconductor layer includes zinc oxide semiconductor, the zinc oxide semiconductor including an n-type doped zinc oxide semiconductor doped with one or more of B, Al, Sc, Y, Ge, Sn, Ti, Zr, V, Nb, Mo, F and Cl.

20. The detection apparatus according to claim 19, wherein the material for forming the semiconductor layer includes a zinc oxynitride semiconductor, or a gallium nitride semiconductor, or a silicon carbide semiconductor, or a diamond semiconductor, or a diamond-like semiconductor, or an aluminium nitride semiconductor, or a gallium arsenide semiconductor, or a boron nitride semiconductor, or a combination thereof.

* * * * *